(12) United States Patent
Zamel et al.

(10) Patent No.: US 7,170,919 B2
(45) Date of Patent: Jan. 30, 2007

(54) DIODE-PUMPED SOLID-STATE LASER GAIN MODULE

(75) Inventors: James Michael Zamel, St. Charles, MO (US); Randall St. Pierre, Rancho Palos Verdes, CA (US); John A. Szot, Hermosa Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 121 days.

(21) Appl. No.: 10/602,057

(22) Filed: Jun. 23, 2003

(65) Prior Publication Data

US 2004/0258123 A1 Dec. 23, 2004

(51) Int. Cl.
*H01S 3/09* (2006.01)
*H01S 3/092* (2006.01)

(52) U.S. Cl. .......................................... 372/69; 372/70
(58) Field of Classification Search ............ 372/34–36, 372/69–71
See application file for complete search history.

(56) References Cited

U.S. PATENT DOCUMENTS

| | | | |
|---|---|---|---|
| 3,303,432 A | 2/1967 | Garfinkel et al. ........... | 331/94.5 |
| 3,339,151 A | 8/1967 | Smith ........................ | 331/94.5 |
| 3,590,248 A | 6/1971 | Chatterton .................. | 250/199 |
| 3,633,126 A | 1/1972 | Martin et al. ............... | 331/94.5 |
| 3,683,296 A | 8/1972 | Scalise ....................... | 331/94.5 |
| 3,771,031 A | 11/1973 | Kay ........................ | 317/235 R |
| 3,810,041 A | 5/1974 | Martin ....................... | 331/94.5 |
| 3,962,655 A | 6/1976 | Selway et al. ............. | 331/94.5 |
| 4,057,101 A | 11/1977 | Ruka et al. ..................... | 165/1 |
| 4,092,614 A | 5/1978 | Sakuma et al. ............ | 331/94.5 |
| 4,150,341 A | 4/1979 | Ferguson .................. | 331/94.5 |
| 4,228,406 A | 10/1980 | Lewis et al. ............... | 331/94.5 |
| 4,233,567 A | 11/1980 | Chernoch .................. | 331/94.5 |
| 4,284,963 A | 8/1981 | Allen, Jr. et al. .......... | 331/94.5 |

(Continued)

FOREIGN PATENT DOCUMENTS

EP 0253935 1/1988

(Continued)

OTHER PUBLICATIONS

Ahern, W.E., "Thermal Spacer for Room Temperature Close-Packed GaAs Laser Arrays," IBM Technical Disclosure Bulletin, May 1970, vol. 12, No. 12, p. 2133.

(Continued)

*Primary Examiner*—Minsun Oh Harvey
*Assistant Examiner*—Phillip Nguyen
(74) *Attorney, Agent, or Firm*—Jenkens & Gilchrist (57) ABSTRACT

A laser gain device (10) holds a laser slab (60) which is pumped by pump energy from at least one diode array assembly (24). An angle at which pump energy from the diode array assembly (24) impinges the laser slab (60) is adjustable via angle adjustment means. The laser slab (60) is mounted between edge bars (62, 64) which have laser slab spacers (84) extending therethrough, allowing laser slabs (60) of different widths to be mounted within the laser gain device (10). One or more pump energy shields (88, 90) are used to control the amount of pump energy entering the laser slab (60), and cooling liquid conduits (100) are provided throughout components of the laser gain device (10), serving to conductively cool a heat shield (12).

17 Claims, 12 Drawing Sheets

U.S. PATENT DOCUMENTS

| | | | | |
|---|---|---|---|---|
| 4,315,225 | A | 2/1982 | Allen, Jr. et al. | 372/35 |
| 4,378,601 | A | 3/1983 | Eggleston, III et al. | 372/66 |
| 4,383,270 | A | 5/1983 | Schelhorn | 357/71 |
| 4,393,393 | A | 7/1983 | Allen, Jr. et al. | 357/81 |
| 4,415,234 | A | 11/1983 | Meyers | 350/310 |
| 4,454,602 | A | 6/1984 | Smith | 372/36 |
| 4,468,774 | A | 8/1984 | Robbins | 372/34 |
| 4,475,790 | A | 10/1984 | Little | 350/96.21 |
| 4,528,671 | A | 7/1985 | Robbins | 372/68 |
| 4,573,067 | A | 2/1986 | Tuckerman et al. | 357/82 |
| 4,575,854 | A | 3/1986 | Martin | 372/75 |
| 4,617,585 | A | 10/1986 | Yasui | 357/72 |
| 4,617,724 | A | 10/1986 | Yokoyama et al. | 29/576 B |
| 4,623,086 | A | 11/1986 | Tihanyi et al. | 228/123 |
| 4,653,061 | A | 3/1987 | Fukae | 372/66 |
| 4,673,030 | A | 6/1987 | Basiulis | 165/32 |
| 4,699,465 | A | 10/1987 | Rice et al. | 350/162.11 |
| 4,710,940 | A | 12/1987 | Sipes, Jr. | 372/75 |
| 4,716,568 | A | 12/1987 | Seifres et al. | 372/36 |
| 4,730,324 | A | 3/1988 | Azad | 372/33 |
| 4,731,795 | A | 3/1988 | Clark et al. | 372/107 |
| 4,792,930 | A | 12/1988 | Kobayashi et al. | 367/140 |
| 4,831,629 | A | 5/1989 | Paoli et al. | 372/50 |
| 4,847,848 | A | 7/1989 | Inoue et al. | 372/50 |
| 4,852,109 | A | 7/1989 | Kuchar | 372/34 |
| 4,881,233 | A | 11/1989 | von Arb et al. | 372/35 |
| 4,881,237 | A | 11/1989 | Donnelly | 372/50 |
| 4,894,839 | A | 1/1990 | Baer | 372/93 |
| 4,899,204 | A | 2/1990 | Rosen et al. | 357/30 |
| 4,901,330 | A | 2/1990 | Wolfram et al. | 372/75 |
| 4,916,712 | A | 4/1990 | Bender | 372/75 |
| 4,924,474 | A | 5/1990 | Yagi et al. | 372/75 |
| 4,942,586 | A | 7/1990 | Lai | 372/68 |
| 4,949,346 | A | 8/1990 | Kuper et al. | 372/36 |
| 4,963,741 | A | 10/1990 | McMullin | 250/338.3 |
| 4,972,426 | A * | 11/1990 | Steffen | 372/35 |
| 4,975,923 | A | 12/1990 | Buus et al. | 372/50 |
| 4,984,246 | A | 1/1991 | Cabaret et al. | 372/69 |
| 4,993,041 | A | 2/1991 | Sidler et al. | 372/98 |
| 5,005,640 | A | 4/1991 | Lapinski et al. | 165/170 |
| 5,012,481 | A | 4/1991 | Casteleiro | 372/72 |
| 5,019,769 | A | 5/1991 | Levinson | 372/31 |
| 5,022,042 | A | 6/1991 | Bradley | 372/75 |
| 5,031,183 | A | 7/1991 | Waters | 372/45 |
| 5,031,187 | A | 7/1991 | Orenstein et al. | 372/50 |
| 5,040,187 | A | 8/1991 | Karpinski | 372/50 |
| 5,073,838 | A | 12/1991 | Ames | 361/103 |
| 5,076,655 | A | 12/1991 | Bluege | 165/104.17 |
| 5,084,888 | A | 1/1992 | Tajima et al. | 372/39 |
| 5,099,214 | A | 3/1992 | Rosen et al. | 333/157 |
| 5,099,488 | A | 3/1992 | Ahrabi et al. | 372/361 |
| 5,105,429 | A | 4/1992 | Mundinger et al. | 372/34 |
| 5,115,445 | A | 5/1992 | Mooradian | 372/75 |
| 5,116,455 | A | 5/1992 | Daly | 156/605 |
| 5,123,025 | A | 6/1992 | Papuchon et al. | 372/72 |
| 5,127,072 | A | 6/1992 | Blauvelt et al. | 385/88 |
| 5,128,951 | A | 7/1992 | Karpinski | 372/50 |
| 5,156,999 | A | 10/1992 | Lee | 437/215 |
| 5,163,064 | A | 11/1992 | Kim et al. | 372/50 |
| 5,181,221 | A | 1/1993 | Mori et al. | 372/46 |
| 5,212,699 | A | 5/1993 | Masuko et al. | 372/34 |
| 5,212,707 | A | 5/1993 | Heidel et al. | 372/50 |
| 5,216,263 | A | 6/1993 | Paoli | 257/88 |
| 5,216,688 | A | 6/1993 | Kortz et al. | 372/75 |
| 5,222,095 | A | 6/1993 | Zediker et al. | 372/108 |
| 5,243,619 | A | 9/1993 | Albers et al. | 372/97 |
| 5,251,369 | A * | 10/1993 | August et al. | 29/281.5 |
| 5,253,260 | A | 10/1993 | Palombo | 372/34 |
| 5,257,277 | A | 10/1993 | Yagi et al. | 372/75 |
| 5,265,113 | A | 11/1993 | Halldorsson et al. | 372/36 |
| 5,278,860 | A * | 1/1994 | August et al. | 372/70 |
| 5,284,790 | A | 2/1994 | Karpinski | 437/129 |
| 5,287,375 | A | 2/1994 | Fujimoto | 372/38 |
| 5,305,344 | A | 4/1994 | Patel | 372/50 |
| 5,311,528 | A | 5/1994 | Fajino | 372/35 |
| 5,311,535 | A | 5/1994 | Karpinski | 372/50 |
| 5,311,536 | A | 5/1994 | Paoli et al. | 372/50 |
| 5,315,154 | A | 5/1994 | Elwell | 257/707 |
| 5,323,411 | A | 6/1994 | Shirasaka et al. | 372/43 |
| 5,325,384 | A | 6/1994 | Herb et al. | 372/36 |
| 5,337,325 | A | 8/1994 | Hwang | 372/36 |
| 5,351,259 | A | 9/1994 | Ishimori et al. | 372/75 |
| 5,383,208 | A | 1/1995 | Queniat et al. | 372/29 |
| 5,388,755 | A | 2/1995 | Baxter | 228/123.1 |
| 5,394,426 | A | 2/1995 | Joslin | 372/50 |
| 5,394,427 | A * | 2/1995 | McMinn et al. | 372/70 |
| 5,402,436 | A | 3/1995 | Paoli | 372/50 |
| 5,402,437 | A | 3/1995 | Mooradian | 372/92 |
| 5,418,809 | A * | 5/1995 | August et al. | 372/71 |
| 5,438,580 | A | 8/1995 | Patel et al. | 372/36 |
| 5,446,749 | A | 8/1995 | Nighan, Jr. et al. | 372/22 |
| 5,452,118 | A | 9/1995 | Maruska | 359/191 |
| 5,463,649 | A | 10/1995 | Ashby et al. | 372/40 |
| 5,475,702 | A * | 12/1995 | August et al. | 372/69 |
| 5,485,482 | A | 1/1996 | Selker et al. | 372/75 |
| 5,504,762 | A | 4/1996 | Hutchison | 372/29 |
| 5,521,936 | A | 5/1996 | Irwin | 372/75 |
| 5,526,373 | A | 6/1996 | Karpinski | 372/101 |
| 5,533,163 | A | 7/1996 | Muendel | 385/126 |
| 5,550,852 | A | 8/1996 | Patel et al. | 372/33 |
| 5,561,684 | A | 10/1996 | Martin | 372/107 |
| 5,563,899 | A | 10/1996 | Meissner et al. | 372/39 |
| 5,570,387 | A | 10/1996 | Carriere et al. | 372/50 |
| 5,590,147 | A | 12/1996 | Hobbs et al. | 372/75 |
| 5,638,388 | A | 6/1997 | Nighan, Jr. et al. | 372/22 |
| 5,663,979 | A | 9/1997 | Marshall | 372/103 |
| 5,668,825 | A | 9/1997 | Karpinski | 372/101 |
| 5,696,784 | A | 12/1997 | Srinivasan et al. | 372/46 |
| 5,715,264 | A | 2/1998 | Patel et al. | 372/36 |
| 5,734,672 | A | 3/1998 | McMinn et al. | 372/50 |
| 5,745,514 | A | 4/1998 | Patel et al. | 372/43 |
| 5,745,519 | A | 4/1998 | Ruda et al. | 372/101 |
| 5,754,575 | A * | 5/1998 | Sukhman et al. | 372/36 |
| 5,764,675 | A | 6/1998 | Juhala | 372/50 |
| 5,778,132 | A | 7/1998 | Csipkes et al. | 385/135 |
| 5,790,575 | A * | 8/1998 | Zamel et al. | 372/35 |
| 5,835,518 | A | 11/1998 | Mundinger et al. | 372/50 |
| 5,898,211 | A | 4/1999 | Marshall et al. | 257/601 |
| 5,913,108 | A | 6/1999 | Stephens et al. | 438/109 |
| 5,923,694 | A | 7/1999 | Culver | 372/69 |
| 5,930,282 | A * | 7/1999 | Unternahrer et al. | 372/69 |
| 5,985,684 | A | 11/1999 | Marshall et al. | 438/26 |
| 5,987,043 | A | 11/1999 | Brown et al. | 372/36 |
| 6,026,109 | A | 2/2000 | Micke et al. | 372/92 |
| 6,052,392 | A | 4/2000 | Ueda et al. | 372/6 |
| 6,052,396 | A | 4/2000 | Zamel et al. | 372/34 |
| 6,061,378 | A | 5/2000 | Marshall et al. | 372/75 |
| 6,101,206 | A | 8/2000 | Apollonov et al. | 372/50 |
| 6,134,258 | A | 10/2000 | Tulloch et al. | 372/99 |
| 6,195,379 | B1 * | 2/2001 | Jones et al. | 372/87 |
| 6,198,758 | B1 * | 3/2001 | Broderick et al. | 372/36 |
| 6,272,164 | B1 | 8/2001 | McMinn et al. | 372/50 |
| 6,301,277 | B1 * | 10/2001 | Tinti et al. | 372/35 |
| 6,307,871 | B1 | 10/2001 | Heberle | 372/34 |
| 6,310,900 | B1 | 10/2001 | Stephens et al. | 372/36 |
| 6,351,478 | B1 | 2/2002 | Heberle | 372/36 |
| 6,385,226 | B2 | 5/2002 | McMinn et al. | 372/50 |
| 6,570,895 | B2 | 5/2003 | Heberle | 372/34 |
| 2003/0138021 | A1 * | 7/2003 | Hodgson et al. | 372/75 |

FOREIGN PATENT DOCUMENTS

| | | | |
|---|---|---|---|
| EP | 0432009 | A1 | 6/1991 |
| EP | 0458469 | A1 | 11/1991 |

| | | | |
|---|---|---|---|
| EP | 0486175 A3 | 5/1992 | |
| EP | 0512541 A2 | 11/1992 | |
| EP | 0512541 A3 | 11/1992 | |
| EP | 0550996 A1 | 7/1993 | |
| EP | 0634822 A1 | 1/1995 | |
| EP | 0669684 A2 | 8/1995 | |
| EP | 0687047 A1 | 12/1995 | |
| EP | 0743725 A1 | 11/1996 | |
| EP | 0805527 A2 | 11/1997 | |
| EP | 0 820 126 A2 | 1/1998 | |
| EP | 0823759 B1 | 2/1998 | |
| EP | 0833419 A1 | 4/1998 | |
| EP | 0840410 A2 | 5/1998 | |
| EP | 0840410 A3 | 5/1998 | |
| GB | 2190784 A | 11/1987 | |
| GB | 2215906 A | 9/1989 | |
| GB | 2241109 A | 8/1991 | |
| JP | 55-65450 | 5/1980 | |
| JP | 59067639 | 10/1985 | |
| JP | 01123493 A | 5/1989 | |
| JP | 02281782 | 11/1990 | |
| JP | 03-6875 | 1/1991 | |
| JP | 03016290 A | 1/1991 | |
| JP | 04023373 A | 1/1992 | |
| JP | 04023381 | 1/1992 | |
| JP | 04-359207 | 12/1992 | |
| JP | 08172235 A | 7/1996 | |
| JP | 8-204263 | 8/1996 | |
| JP | 10135548 A2 | 10/1996 | |
| JP | 09326524 | 12/1997 | |
| JP | 2003 78194 | 3/2003 | |
| WO | WO 90/13158 | 11/1990 | |
| WO | WO 91/05382 | 4/1991 | |
| WO | WO 96/28846 | 9/1996 | |
| WO | WO 98/35410 | 8/1998 | |
| WO | WO 98/35411 | 8/1998 | |

OTHER PUBLICATIONS

ALC 1064-50P User's Manual, Amoco Laser Company, no date.
Broderick, N.G.R., et al., "Power Scaling in Passively Mode-Locked Large-Mode Area Fiber Lasers," IEEE Photonics Technology Letters, Dec. 1998, vol. 10, No. 12, pp. 1718-1720.
Laser Diodes and Bars, Coherent, Inc., no date.
Laser Mounts, Precision Laser Mounts, Four-Axis Adjustable Laser Mount, Vertical Laser Mounts; Creative Stars, 1997.
Endriz, John G., et al., "High Power Diode Laser Arrays," IEEE Journal of Quantum Electronics, Apr. 28, 1992, No. 4, pp. 952-965.
Hughes, D.W., et al., "Laser Diode Pumped Solid State Lasers," Journal of Physics D: Applied Physics 25, Apr. 14, 1992, No. 4, pp. 563-586.
"Circuit Module Cooling with Multiple Pistons Contacting a Heat Spreader/Electrical Buffer Plate in Contact with Chip," IBM Corp., IBM Technical Disclosure Bulletin, May 1989, vol. 31, No. 12, pp. 5-7.
"Heat Sink Assembly for Tab-Mounted Devices," IBM Corp., IBM Technical Disclosure Bulletin, Nov. 1988, vol. 31, No. 6, pp. 372-373.
Ishimori, Akira, et al., "Pumping Configuration Without Focusing Lenses for a Small-Sized Diode-Pumped Nd: YAG Slab Laser," Optics Letters, Jan. 1, 1992, vol. 17, No. 1, pp. 40-42.
Collimated Diode Laser Assemblies, Melles Griot, no date.
Cylindrical Laser Holders, Melles Griot, 1995.
Mundinger, D., et al., "High Average Power Edge Emitting Laser Diode Arrays on Silicon Microchannel Coolers," Applied Physics Letters 57, Nov. 19, 1990, No. 21, pp. 2172-2174.
Nabors, C.D., et al., "High-Power, Continuous-Wave, Nd: YAG Microchip Laser Array," Optics Letters, Nov. 15, 1992, vol. 17, No. 22, pp. 1587-1589.
Laser Mounts, Newport, 1997.
Precision Gimbal Mounts, Oriel, 1992.
Paschotta, Rudiger, "Ytterbium-Doped Fiber Amplifiers," IEEE Journal of Quantum Electronics, Jul. 1997, vol. 33, No. 7, pp. 1049-1056.
SDL-FL10, SDL, Inc., 1993.
Sekiguchi, Hiroshi, et al., "New Type of Fiber Laser: Concept & Realization," 2 pages.
Semiconducteurs Specifiques, Thomson-CSF.
Ueda, K., et al., "Future of High-Power Fiber Lasers," Laser Physics, vol. 8, No. 3, pp. 774-781.
Ueda, Ken-ichi, "The Next Generation of High-Power Fiber Lasers—A Unique Proposal from Japan," Special Lecture, pp. 52-60.
Usui, Mitsuo, et al., "Novel Packaging Technique for Laser Diode Arrays Using Film Carrier," 43rd Electronic Components & Technology Conference, Jun. 1, 1993, pp. 818-824.

* cited by examiner

DIODE-PUMPED SOLID-STATE LASER GAIN MODULE

BACKGROUND OF THE INVENTION

1. Field of the Invention

The present invention relates generally to optical components and more specifically relates to a diode-pumped laser gain module.

2. Description of the Prior Art

Laser gain devices employing laser slabs use sources of optical energy to pump laser slabs and produce an output laser beam. Output beams may be used in applications such as optical lithography for microchip production.

While laser gain devices have achieved success and are widely used, they have some shortcomings. For example, many laser gain devices are sized for use with a certain type of laser slab having specific dimensions, and even laser slabs designed to have the same dimensions may have slight variations that impact their exact fit into a laser device. The choice of a different laser slab—or the replacement of a worn or damaged laser slab with a new laser slab—may require reconstruction of several parts of a laser system to accommodate a laser slab of a different size.

Further, it is desirable to maximize the amount of input optical energy (for example, from one or more diode arrays) entering the optimum area of a laser slab. Removal of a laser slab from a laser gain device for repair or replacement may change the alignment or the amount of optical energy entering the laser slab, thereby decreasing the overall efficiency of the system.

The considerations of proper direction of input energy and optimization of the laser device to accommodate specific laser slab sizes impact the heat dissipation of the laser device. As changes are made to the laser device for the purposes of fitting laser slabs and optimizing light input into laser slabs, the efficiency of heat removal from the laser device may change.

There is a need for a laser gain module that allows for optimization of the gain module for different laser slabs, control of the amount and angle of light entering a laser slab, and efficient heat dissipation from within the gain module.

SUMMARY OF THE INVENTION

These and other goals are achieved by embodiments of the present invention.

According to one embodiment of the present invention, a laser gain module comprises top and bottom edge bars contacting the laser slab and having variable spacers for accommodating different slab sizes.

According to another embodiment of the present invention, a laser gain module is provided with one or more adjustable diode array brackets for changing the distance between diode arrays and a laser slab and also for changing the angle of diode light as it enters a laser slab.

According to a further embodiment of the present invention, changeable light shields are provided within a laser gain module between a window and a laser slab for allowing control of the amount and location of light entering a laser slab.

According to still another embodiment of the present invention, a conductively cooled heat shield is provided for allowing easy removal of a heat shield device and efficient use of cooling fluid in a laser gain module.

The above summary of the present invention is not intended to represent each embodiment or every aspect of the present invention. This is the purpose of the Figures and the detailed description which follows.

BRIEF DESCRIPTION OF THE DRAWINGS

The foregoing and other advantages of the invention will become apparent upon reading the following detailed description and upon reference to the drawings.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF PREFERRED EMBODIMENTS

Figure 1:
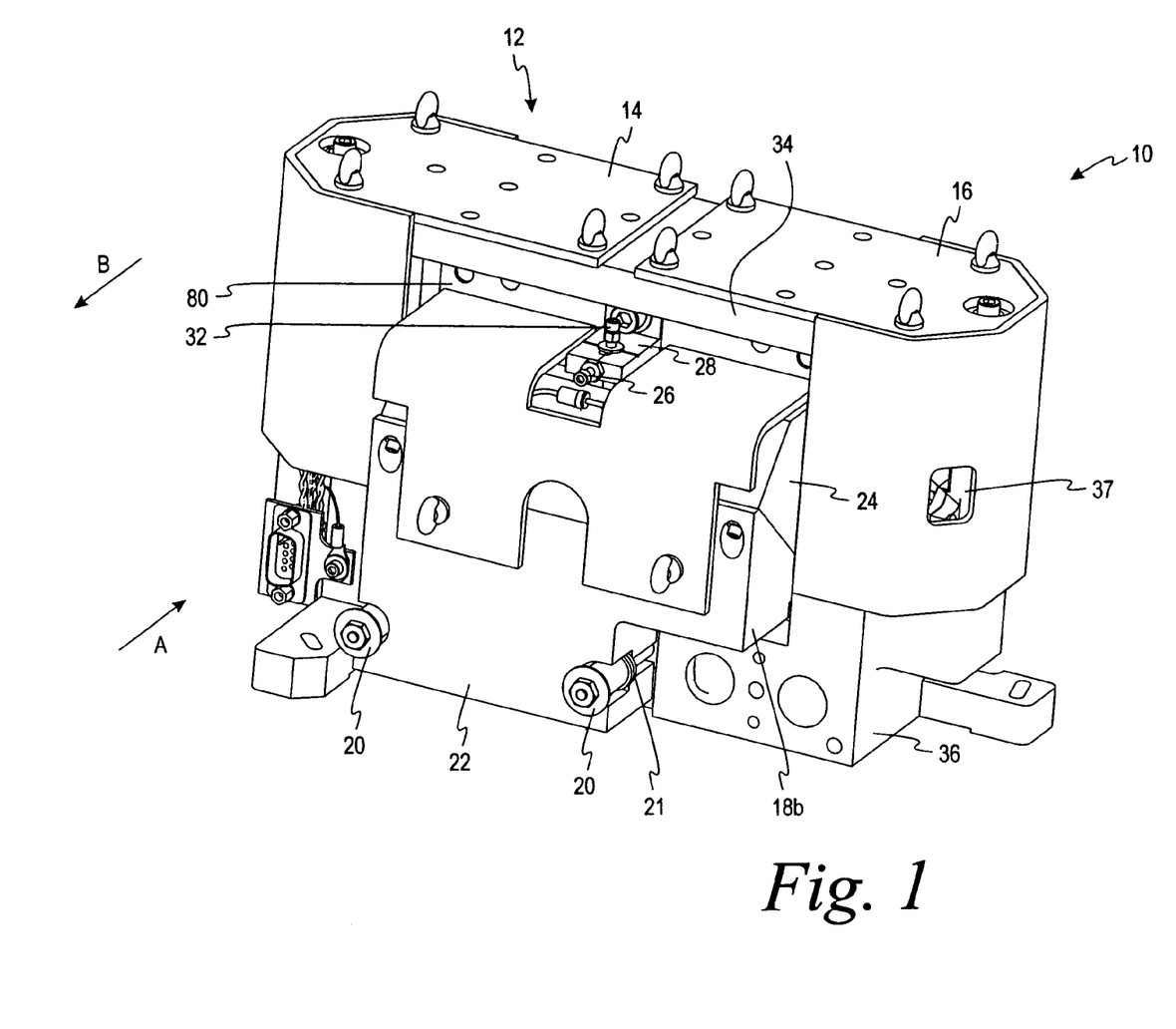
FIG. 1 is an isometric view of a laser gain module according to one embodiment of the present invention.
Figure 3:
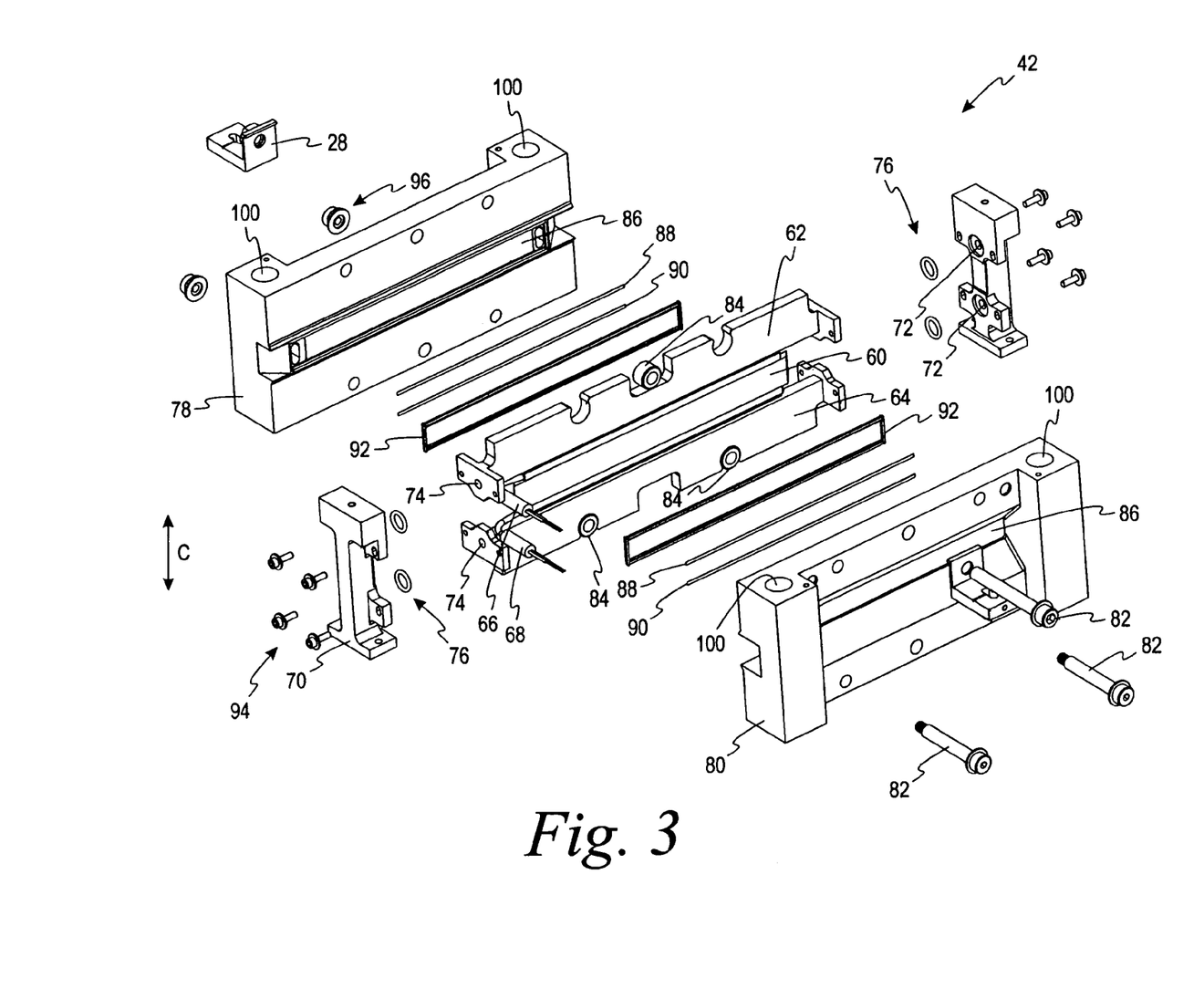
FIG. 3 is an exploded view of the laser slab housing of FIG. 1.

Turning now to the drawings, FIG. 1 shows an isometric, external view of a laser gain module 10 according to one embodiment of the present invention. The laser gain module 10 comprises a heat shield 12 including a first heat shield component 14 and a second heat shield component 16. The structure and function of the heat shield 12 will be explained more fully below. The laser gain module 10 contains a solid-state laser slab 60 (as shown in FIG. 3, below) which is optically pumped by diode arrays, also provided within the laser gain module 10, in diode array assemblies 24. The diode array assemblies 24, in turn, are held by diode mounts 18, which support the diode array assemblies 24 and also allow for translation of the diodes toward and away from the solid-state laser slab 60 and for control over the angles at which light leaving the diode array assemblies 24 enters the solid-state laser slab 60. According to one embodiment, the control of translation and angle of the diode mounts 18 allows for control and optimization of pump uniformity and optical path difference (OPD) uniformity.

The diode mount 18b, shown in FIG. 1, is held on the laser gain module 10 along a lower mount portion by spring-loaded bolts 20 driven into a gain module chassis 36. The spring-loaded bolts 20 are loaded with compression springs 21 which exert an inward force on a lower lever portion 22 of the diode mount 18. The direction of the force exerted on the lower lever portion 22 of the diode mount 18 by the compression springs 21 is shown by arrow "A" in FIG. 1. Leverage on the diode mount 18, as described more completely below with respect to FIG. 5, moves the diode array assembly 24 outwardly, in the direction shown by arrow "B" in FIG. 1. The diode array assembly 24 is prevented from moving outwardly by a diode angle adjustment screw 26 provided within an adjustment bracket 28, which in turn is mounted to a slab housing block 80. The diode angle adjustment screw 26 presses against a diode adjustment support 32 which protrudes upwardly from the diode array assembly 24 through a slot provided within the adjustment bracket 28. While the diode adjustment support 32 is shown as a screw extending upwardly from the diode array assembly 24, the diode adjustment support could be other devices as well, such as a pin, dowel, or platform secured to the diode array assembly 24 or otherwise adapted to move with the diode array assembly 24.

The first and second heat shield components 14 and 16 are mounted to a liquid-cooled heat shield base 34 provided on a gain module chassis 36. An output beam aperture 37 is provided within the heat shield 12 for allowing an output beam to exit when the laser slab 60 converts pump energy to the output beam.

Figure 2:
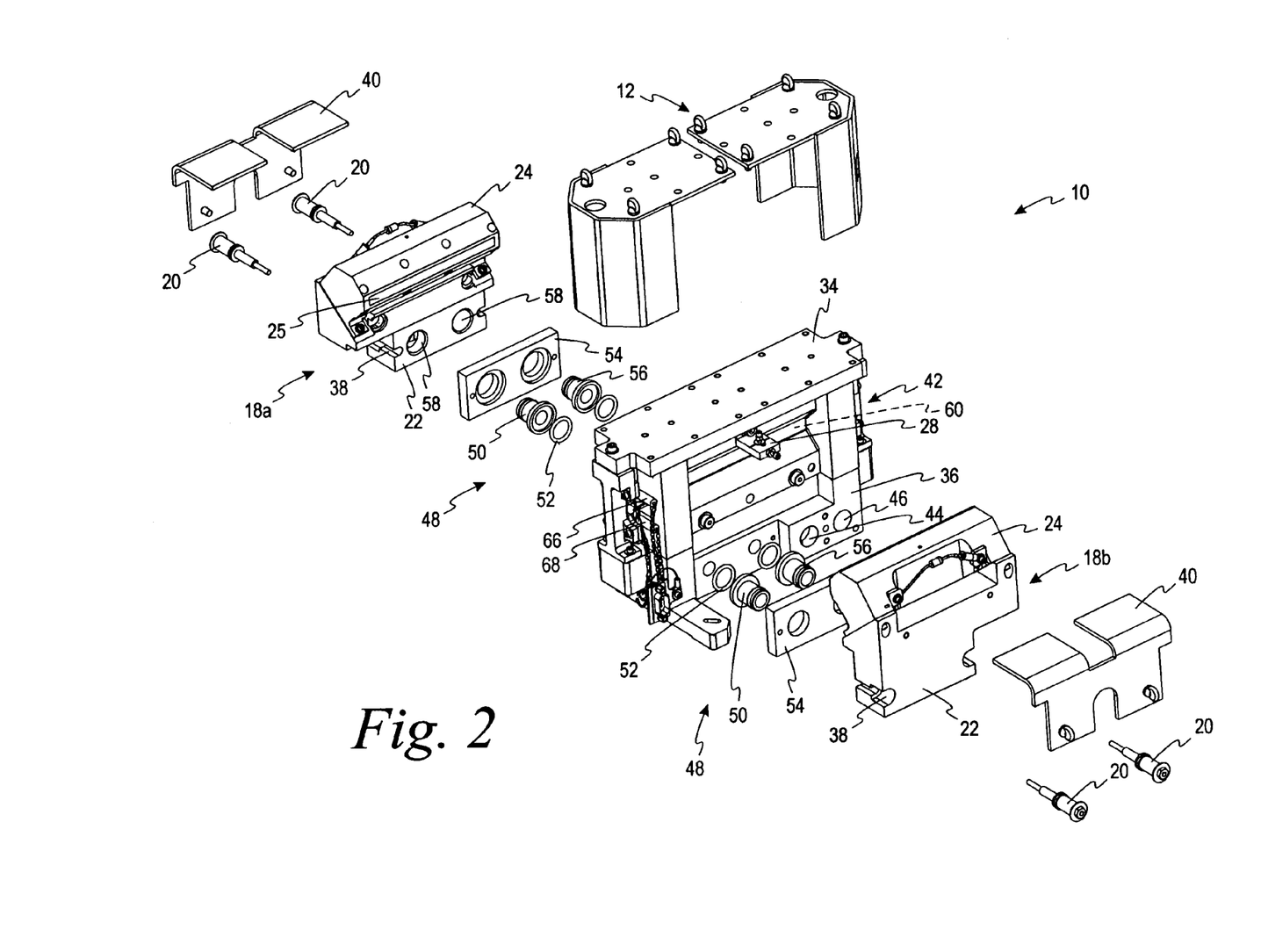
FIG. 2 is an exploded view of the laser gain module of FIG. 1.

Turning now to FIG. 2, the heat shield components 14 and 16 are shown elevated over the heat shield base 34 to which they are mounted. First and second diode mounts 18a and 18b attach to opposite sides of the gain module chassis 36, and the spring-loaded bolts 20 extend through apertures 38 provided within lever portions 22 of the diode mounts 18a and 18b. Outer mount shields 40 are mounted to the diode mounts 18a and 18b to contain the diode array assemblies 24 and to protect the diode array assemblies 24 from damage. Adjustment brackets 28 for facilitating adjustment of the diode angles relative to laser slab 60 are provided on the gain module chassis 36.

The gain module chassis 36 supports a slab housing 42 holding a solid-state laser slab 60 which is optically pumped by energy from energy emission regions 25 of the diodes within the diode array assemblies 24. The laser slab 60, the diode array assemblies 24, and the surrounding support structure must be cooled due to the heat generated by the optical pumping process and by the generation of an output beam within the laser slab 60. As will be described more completely below, cooling is accomplished using a liquid cooling system, using liquid conduits provided in system components.

Several features of the laser gain module 10 related to cooling are shown in FIG. 2, including a coolant entry 44, a coolant outlet 46, diode coolant conduit assemblies 48 (which include diode coolant conduits 50, O-rings 52, and diode coolant conduit brackets 54 and seal rings 56), and mount coolant ports 58. The diode coolant conduit assemblies 48 allow for the provisioning of coolant to the diode array assemblies 24 even as the diode array assemblies 24 are angled and translated with respect to the laser slab 60. The functions of the cooling-related components will be explained more completely below with respect to FIGS. 5–10.

FIG. 3 is an exploded view of the slab housing 42. The slab housing 42 serves to hold a solid-state laser slab 60, to direct coolant to and around the laser slab 60, and to provide windows through which pump radiation is directed to the laser slab 60. The laser slab 60 is supported between first and second edge bars 62 and 64. According to one embodiment, the slab 60 is held in place along edge bar interfaces 118 (shown in FIG. 12). It is preferable to bond the slab to the edge bars 62 and 64 using a thermally conductive and somewhat elastomeric adhesive, such as boron-nitride filled silicone room-temperature-vulcanizing (RTV) adhesive. The present invention may employ slabs made of any type of solid-state laser slab material, for example Nd:YAG. It is preferred to keep the laser slab 60 at a constant temperature, even when the laser gain device is not in operation. To provide heating to the laser slab 60, the edge bars 62 and 64 are electrically heated by current through first and second edge bar conductors 66 and 68. The first and second edge bars 62 and 64 are held together by edge bar brackets 70, which include coolant conduits to direct coolant from the chassis 36, positioned below the laser slab 60, through edge bar bracket apertures 72 into edge bar coolant apertures 74, through the edge bars 62 and 64, and then back down into the chassis 36. The edge bar bracket apertures 72 and the edge bar coolant apertures 74 are sealed by O-rings 76 to prevent coolant leakage.

Each of the slab housing blocks 78 and 80 contains a window 86 through which pump energy enters the laser slab 60. As described in greater detail below, pump energy shields 88 and 90 may be positioned between one or both windows 86 and the laser slab 60 to control pump energy entering the laser slab 60.

The laser slab 60 is sealed to each of the slab housing blocks 78 and 80 with slab seals 92. The slab seals 92 allow the laser slab 60 to be liquid cooled. The slab seals 92 are preferably compressed between the housing blocks 78 and 80 and the laser slab 60 and in one embodiment are comprised of compressible material such as Viton® material made by DuPont, or silicone rubber material. According to one embodiment, the slab seals 92 are compressed to a width of approximately 0.6 inch, though greater or lesser compressions may be used depending on the choice of material. Any seal material compatible with the coolant may be used, and it is preferred to choose a material that experiences little to no degradation when exposed to laser light from the diode array assemblies 24 or generated within the laser slab 60.

Also shown in FIG. 3 are mounting screws 94 for mounting the edge bar brackets 70 to the edge bars 62 and 64 and assembly pin nuts 96 for the assembly pins 82 to screw into. In the embodiment shown in FIG. 3, the diode adjustment bracket 28 opposes and is connected to a top assembly pin 82.

Figure 4:
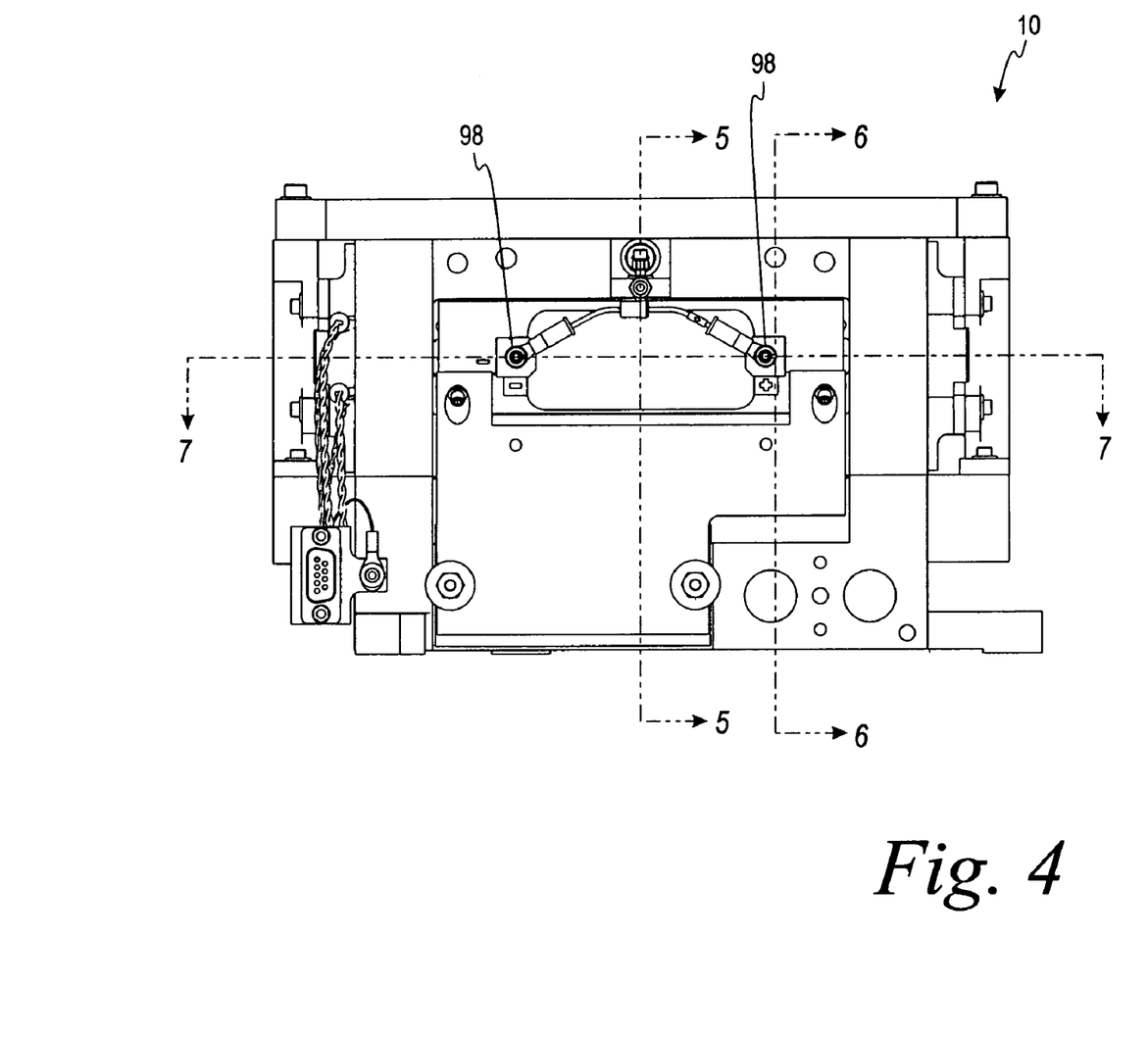
FIG. 4 is a front view of the laser gain module of FIG. 1.

Turning now to FIG. 4, a side view of a laser gain module 10 according to the present invention is shown. In the side view of FIG. 4, the outer mount shield 40, has been removed to provide a more direct view of the diode array assembly 24. Diode electrical connectors 98 provide power to and allow control of pump radiation from the diode array assemblies 24 shown.

Figure 5:
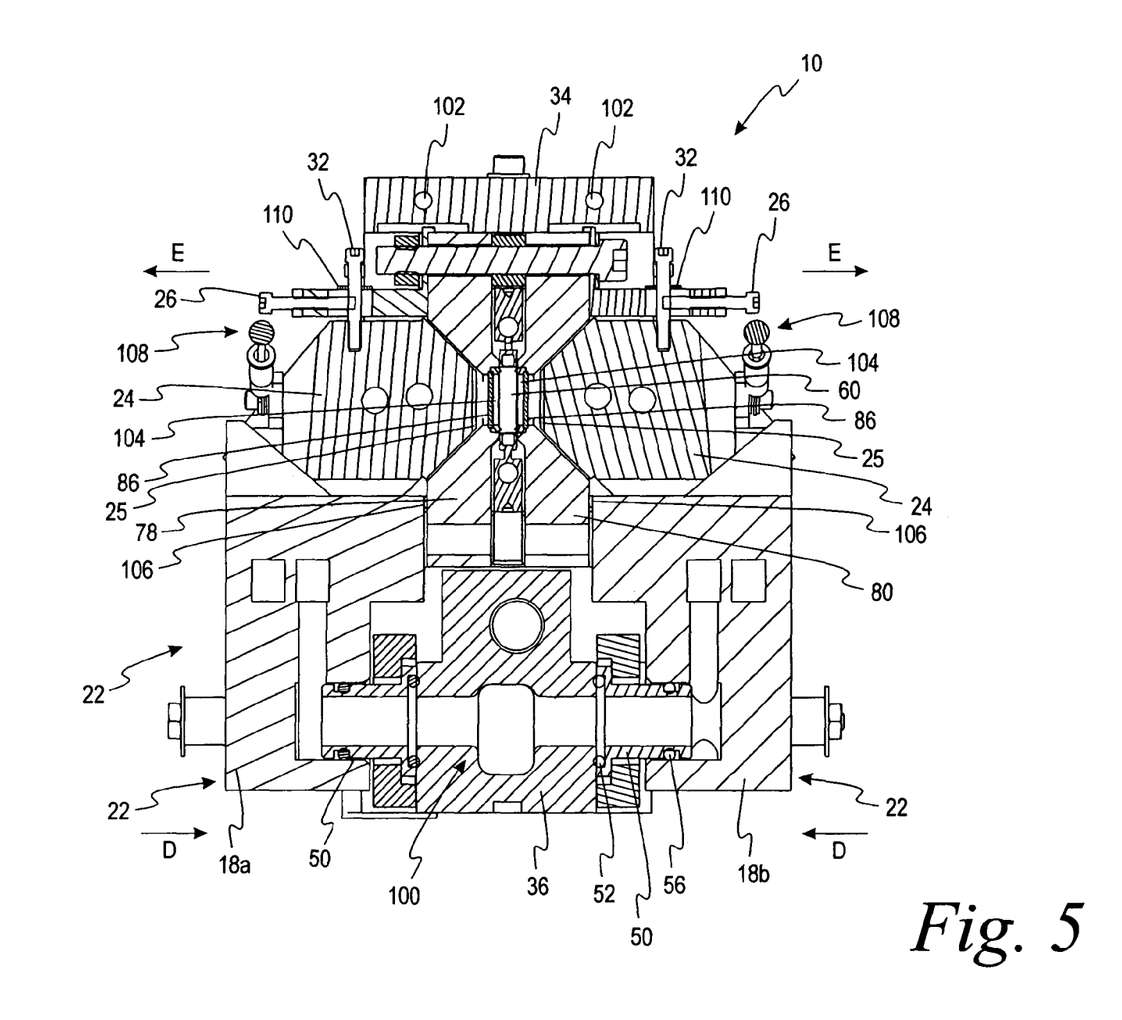
FIG. 5 is a cross-sectional view of the laser gain module of FIG. 4 taken along the line 5—5.

Turning now to FIG. 5, a cross-section along the line 5—5 of FIG. 4 is shown. This cross-sectional view more clearly shows the construction of the laser gain module 10 and illustrates the assembly of several components of the laser device.

Cooling liquid conduits 100 are shown extending throughout several components of the laser gain module 10, including the gain module chassis 36 and the diode mounts 18. Heat shield conduits 102 extend through the heat shield base 34 and slab cooling conduits 104 are shown on opposing sides of the laser slab 60, positioned between the laser slab 60 and the windows 86. The diode coolant conduits 50 for directing coolant liquid between the gain module chassis 36 and the diode mounts 18 are also shown, along with O-rings 52 and seal rings 56. The seal rings 56 ensure that coolant liquid does not leak when the diode mounts 18 are tilted or placed at different spacings within the laser gain module 10.

FIG. 5 illustrates the ability to control the angle of pump energy entering the laser slab 60 as well as translation of the diode array assemblies 24 toward and away from the laser slab 60. The diode mounts 18a and 18b in the embodiment shown in FIG. 5 are provided with diode tilt fulcrums 106. When the lower lever portions 22 of the diode mounts 18a and 18b are biased inwardly toward the gain module chassis 36, in the directions shown by the arrows "D" of FIG. 5, a force will be exerted away from the gain module chassis 36, in the directions shown by the arrows "E" of FIG. 5, at the diode angle adjustment screws 26. That is, as the lower lever portion 22 of the first diode mount 18a is biased inwardly, toward the right in FIG. 5, the top lever portion 108 of the first diode mount 18a, which contains the diode array assembly 24, is biased outwardly, toward the left. Similarly, the lower lever portion 22 of the second diode mount 18b is biased inwardly, toward the left, and the top lever portion 108 of the diode mount 18b is biased outwardly, toward the right. This force results from lever action pushing top lever portions 108 of the diode mounts 18 away from the laser slab 60. The diode angle adjustment screws 26 oppose the diode adjustment supports 32, which are moved toward and away from the center of the gain module chassis 36 within adjustment support slots 110. Thus, by turning the diode angle adjustment screws 26 inwardly (toward the laser slab 60), the angle of light emitted from the energy emission regions 25 of the diode array assemblies 24 may be adjusted downwardly, and by turning the diode angle adjustment screws 26 outwardly, the angle of light emitted by the energy emission regions 25 of the diode array assemblies 24 may be adjusted upwardly.

The embodiment shown in FIG. 5 also allows for the distance from each of the diode array assemblies 24 to the laser slab 60 to be altered by the placement of diode spacers between one or both of the diode tilt fulcrums 106 and the first and second slab housing blocks 78 and 80. In one embodiment, the diode spacers are strips of stainless steel tape allowing the spacing of one or both of the diode mounts 18 in increments of the tape thickness. According to one embodiment, stainless steel tape having a thickness of approximately 0.005 inch is used for diode spacing. Thus the diode array assemblies 24 may be translated toward or away from the laser slab 60 via the diode spacers or angled with respect to the laser slab 60 via the adjustment screws 26 to assure that a desirable amount of pump radiation is inserted into the laser slab 60 at desired angles. This assists in achieving a well-defined, homogeneously illuminated window for each side of the laser slab 60. Further, diode array adjustment allows for the direction of pump radiation toward the laser slab 60 so as to compensate for thermal non-uniformities in the slab. While FIG. 5 shows a two-sided laser gain module 10, it is to be understood that the principles of the present invention may, in an alternative embodiment, be directed to a laser gain module in which a laser slab is pumped from only one side.

Figure 6:
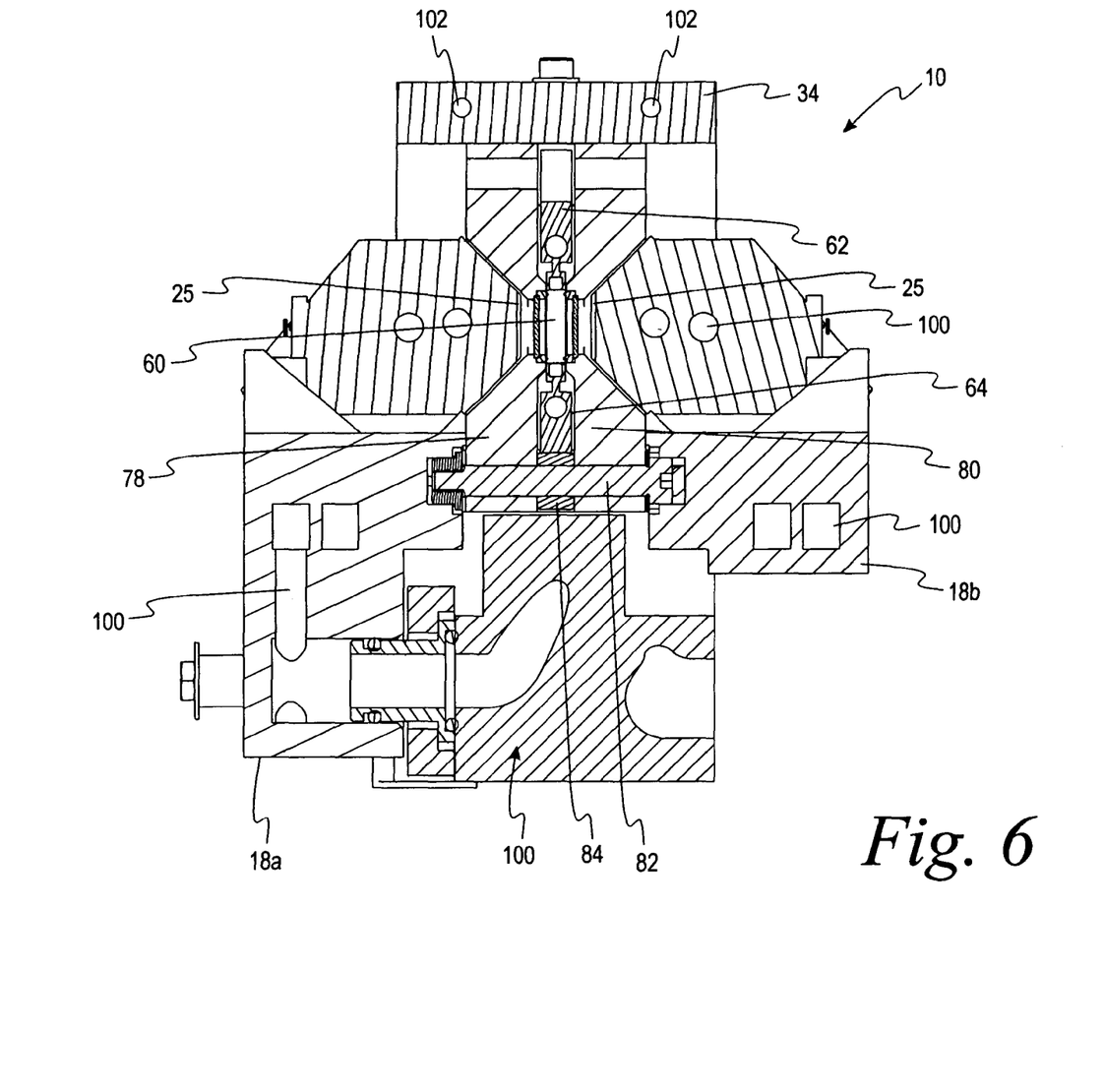
FIG. 6 is a cross-sectional view of the laser gain module of FIG. 4 taken along the line 6—6.

Turning now to FIG. 6, a cross-sectional view of a laser gain module 10 along the line 6—6 of FIG. 4 is shown. This cross-sectional view further shows the cooling liquid conduits 100 extending through the laser gain module 10. This view also shows an assembly pin 82 extending through the first and second slab housing blocks 78 and 80 and also extending through a laser slab spacer 84, which keeps the slab housing blocks 78 and 80 spaced at an optimum distance for the laser slab 60. In the embodiment shown in FIG. 6, the laser slab spacer 84 is approximately twice the width of the laser slab 60. The present invention contemplates laser slab spacers 84 having a range of widths, with specific widths chosen based on the width of the laser slab 60 and the desired spacing of the slab housing blocks 78 and 80. Cooling liquid conduits 100 in the diode mounts 18 can also be seen in this view. First and second edge bars 62 and 64 are shown holding the laser slab 60 from the top and bottom, respectively.

According to one embodiment, the laser slab spacers 84 are approximately the width of the laser slab 60 and they keep the first and second slab housing blocks 78 and 80 an appropriate distance from the laser slab 60, preventing the slab housing blocks 78 and 80 from contacting the laser slab 60.

The use of changeable laser slab spacers 84 allows for the adjustment of spacing between the slab housing blocks 78 and 80 for particular laser slabs, or for a single laser slab whose thickness changes over time. According to one embodiment, the laser slab spacers 84 are made of stainless steel, but other materials such as ceramics, plastics, and other metals may be used. It is preferred to construct the laser slab spacers 84 of materials that have thermal expansion characteristics similar to the thermal expansion characteristics of the assembly pins 82 to minimize thermal expansion problems.

Laser slab thicknesses may change as a result of polishing or of work done on the laser slab to remove flaws on the laser slab surface. When laser slabs 60 having different thicknesses are used in the laser gain module 10, the laser slab spacers 84 allow the re-use of remaining laser gain module components, reducing or eliminating the need for remanufacturing or customization of other laser gain module components. The laser slab spacers 84 also allow for optimization of seals around differently-sized laser slabs 60, preventing or reducing leaking of coolant from the area of a narrower slab and preventing or reducing the overcompression of seals surrounding larger slabs. Overcompression of seals can lead to slab damage and damage to hardware surrounding the slab.

Figure 7:
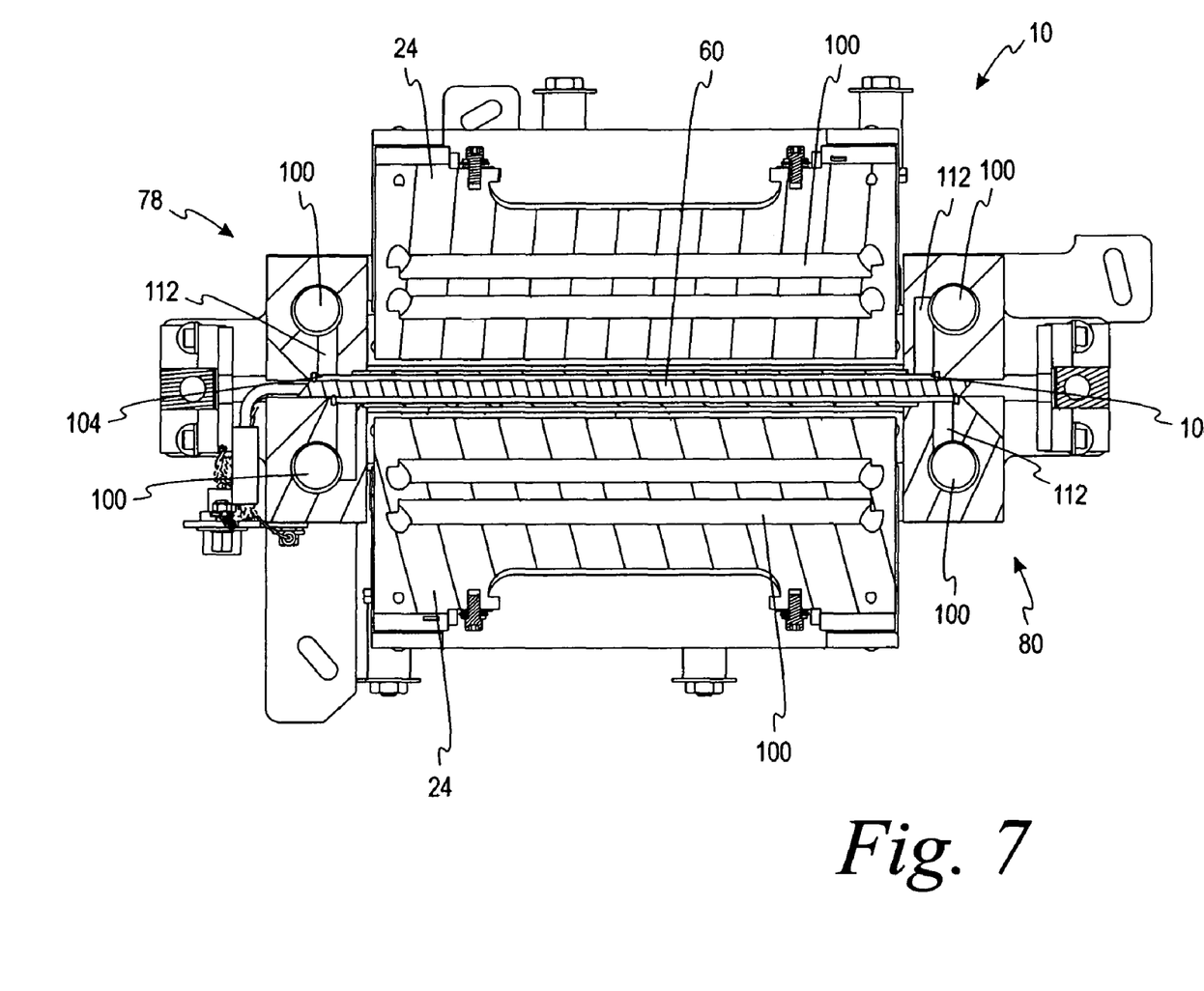
FIG. 7 is a cross-sectional view of the laser gain module of FIG. 4 taken along the line 7—7.

FIG. 7 shows a cross-sectional view of a laser gain module 10 along the line 7—7 of FIG. 4. Cooling liquid conduits 100 in the first and second slab housing blocks 78 and 80 transport cooling liquid to and from the heat shield base 34 (shown in FIG. 2) as explained more fully below. Cooling liquid conduits 100 can also be seen extending through the diode array assemblies 24. The first and second slab housing blocks 78 and 80 are provided with slab cooling liquid diverters 112 for diverting cooling liquid through the slab cooling conduits 104 and thereby to directly cool the laser slab 60. According to one embodiment, cooling liquid is diverted to the laser slab 60 at a ratio of approximately 8:1 in comparison to the diversion of cooling liquid to the heat shield base 34. In this embodiment, for example, if approximately eight gallons per minute of cooling liquid are directed to the slab cooling conduits 104 for cooling the laser slab 60, then approximately one gallon per minute of cooling liquid will be directed to the heat shield base 34. Greater or lesser diversion ratios may be used to achieve efficient cooling of the laser slab 60 and surrounding components.

Figure 8:
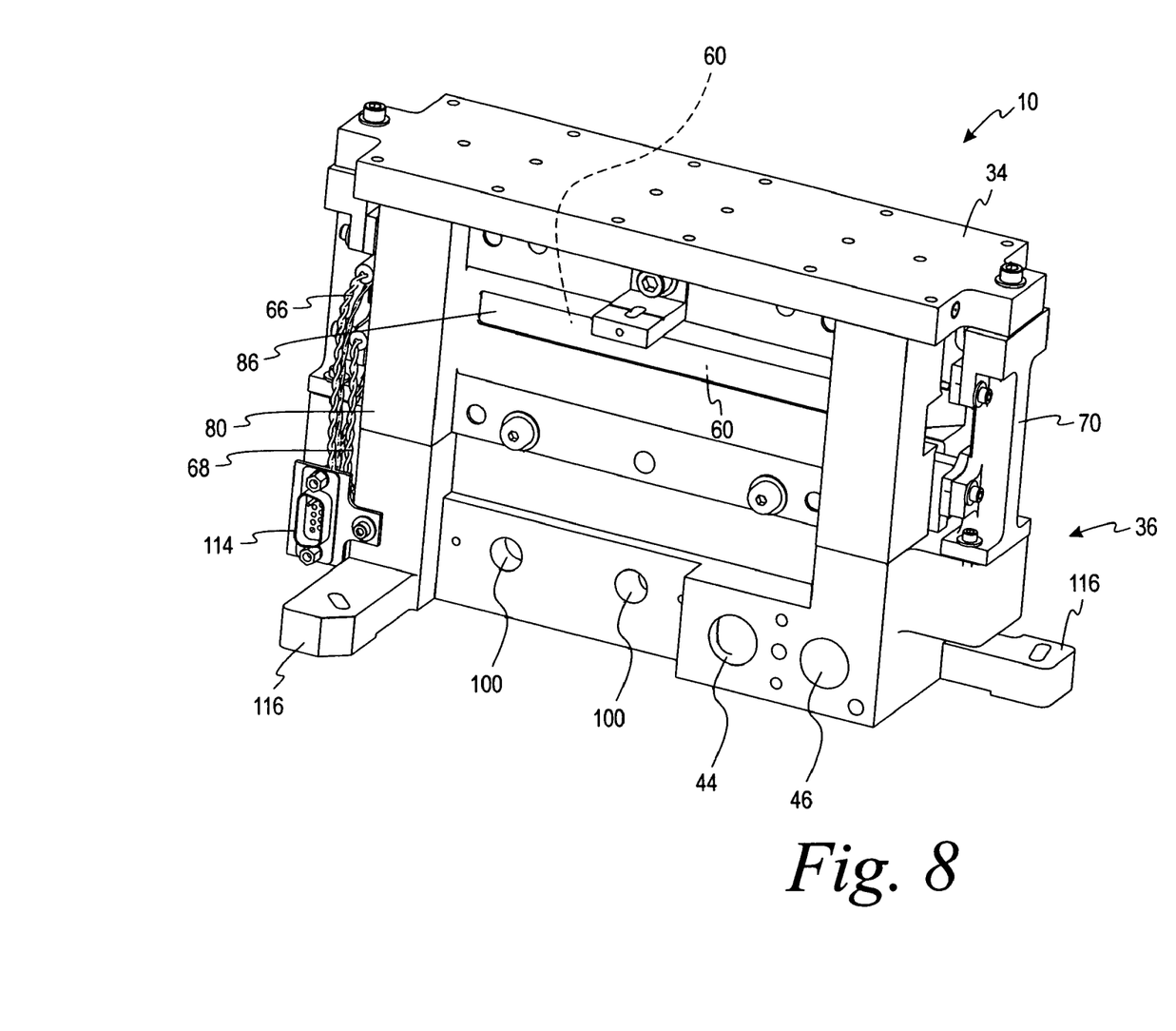
FIG. 8 is an isometric view of a laser gain module according to another embodiment of the present invention with outer portions removed for visibility.

Turning now to FIG. 8, an isometric view of an assembled laser gain module 10 is shown with heat shield components 14 and 16, outer mount shields 40, and diode mounts 18 removed to give a more complete exterior view of an assembled gain module. The window 86 within the second slab housing block 80 allows pump radiation from the diode array assemblies 24 (not shown in FIG. 8) to enter the laser slab 60 (positioned behind the window 80 of FIG. 8). Edge bar conductors 66 and 68 extend from the edge bars 62 and 64 (not shown in FIG. 8) into an edge bar current input 114 which allows for the heating of the edge bars 62 and 64 and the maintenance of the edge bars 62 and 64 at a proper temperature.

Also visible in FIG. 8 are the coolant entry 44 and the coolant outlet 46 of the gain module chassis 36. Cooling liquid conduits 100 are provided within the gain module chassis 36, and table mounts 116 are provided for mounting the gain module chassis 36 to a stable platform.

Figure 9:
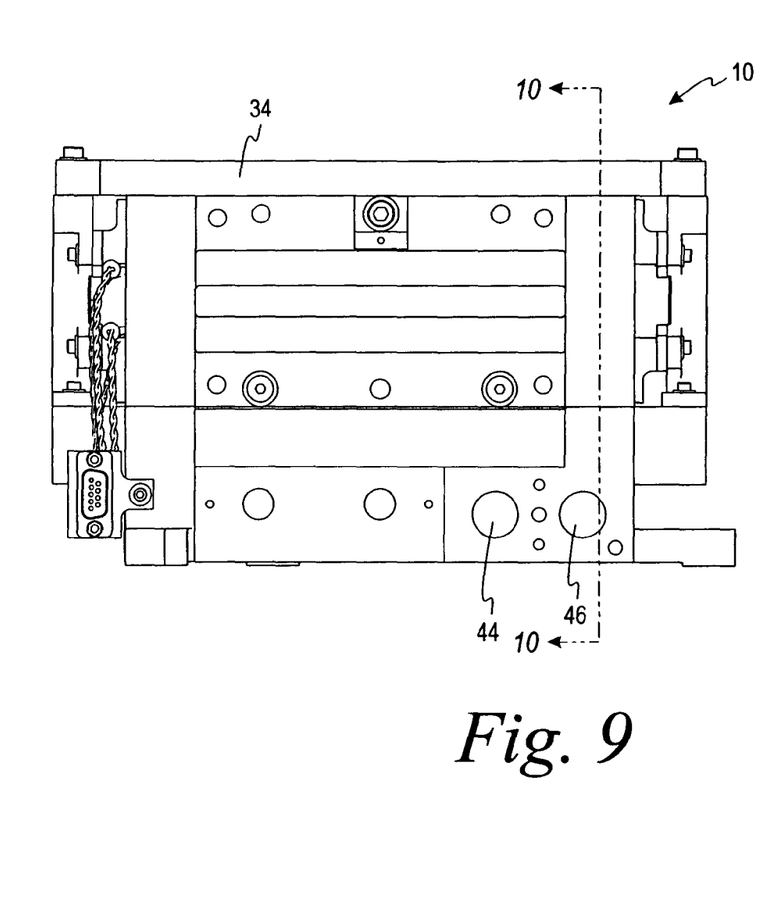
FIG. 9 is a front view of the laser gain module of FIG. 8 with outer portions removed for visibility.
Figure 10:
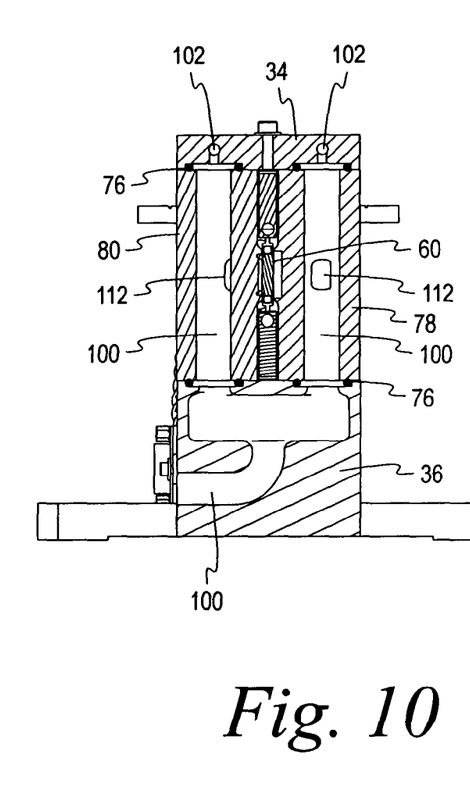
FIG. 10 is a cross-sectional view of the laser gain module of FIG. 9 taken along the line 10—10.

A front view of the laser gain module 10 with heat shield components 14 and 16, outer mount shields 40, and diode mounts 18 removed is shown in FIG. 9, and a cross-sectional view along the line 10—10 of the laser gain module 10 with these shields and diode array mounts removed is shown in FIG. 10. Cooling liquid conduits 100 provided in the gain module chassis 36 carry cooling liquid upwardly to the cooling liquid conduits 100 within the slab housing blocks 78 and 80. Cooling liquid diverters 112 divert cooling liquid to the laser slab 60. O-rings 76 are provided at the interfaces of the gain module chassis 36 and the slab housing blocks 78 and 80 and also at the interfaces of the heat shield base 34 and the slab housing blocks 78 and 80.

According to one embodiment of the present invention, coolant liquid is directed through the laser gain module 10 and used to cool a heat shield 12, as shown in FIGS. 1 and 2. The heat shield 12 serves to contain non-lasing radiation within the laser gain module 10, absorbing non-lasing radiation and protecting surrounding components from the non-lasing radiation. Coolant liquid, such as purified water, enters the gain module chassis 36 through a coolant entry 44 and exits the gain module chassis 36 through a coolant outlet 46 as shown in FIG. 2. Coolant enters and exits the diode mount 18b through a diode coolant conduit assembly 48, which includes diode coolant conduits 50 contacting the gain module chassis 36 at O-rings 52. A diode coolant conduit bracket 54 supports the coolant conduits 50 and provides for spacing between the diode mount 18b and the gain module chassis 36. The coolant conduits 50 are provided with seal rings 56 to prevent leakage of coolant from mount coolant ports 58 when the diode angles are adjusted as described above. The gain module chassis 36 includes cooling liquid conduits which direct coolant upwardly through the slab housing 42 and to the heat shield base 34. The coolant then flows downwardly through the slab housing 42 to the coolant outlet 46. As shown in FIGS. 3, 7, and 10, cooling liquid conduits 100 are provided within the slab housing blocks 78 and 80 to direct coolant upwardly to the heat shield base 34. Heat shield coolant conduits 102, as shown in FIGS. 5, 6, and 10 run through the heat shield base 34. Thus, as the heat shield components 14 and 16 are heated by the absorption of non-lasing radiation, the heat shield base 34 conductively cools the heat shield components 14 and 16 and keeps them at a safe operating temperature, thereby protecting the surrounding environment from unwanted temperature increases. As shown in FIGS. 1 and 2, the heat shield 12 may be provided with angled or curved portions to absorb stray radiation in the laser gain module 10.

Figure 11:
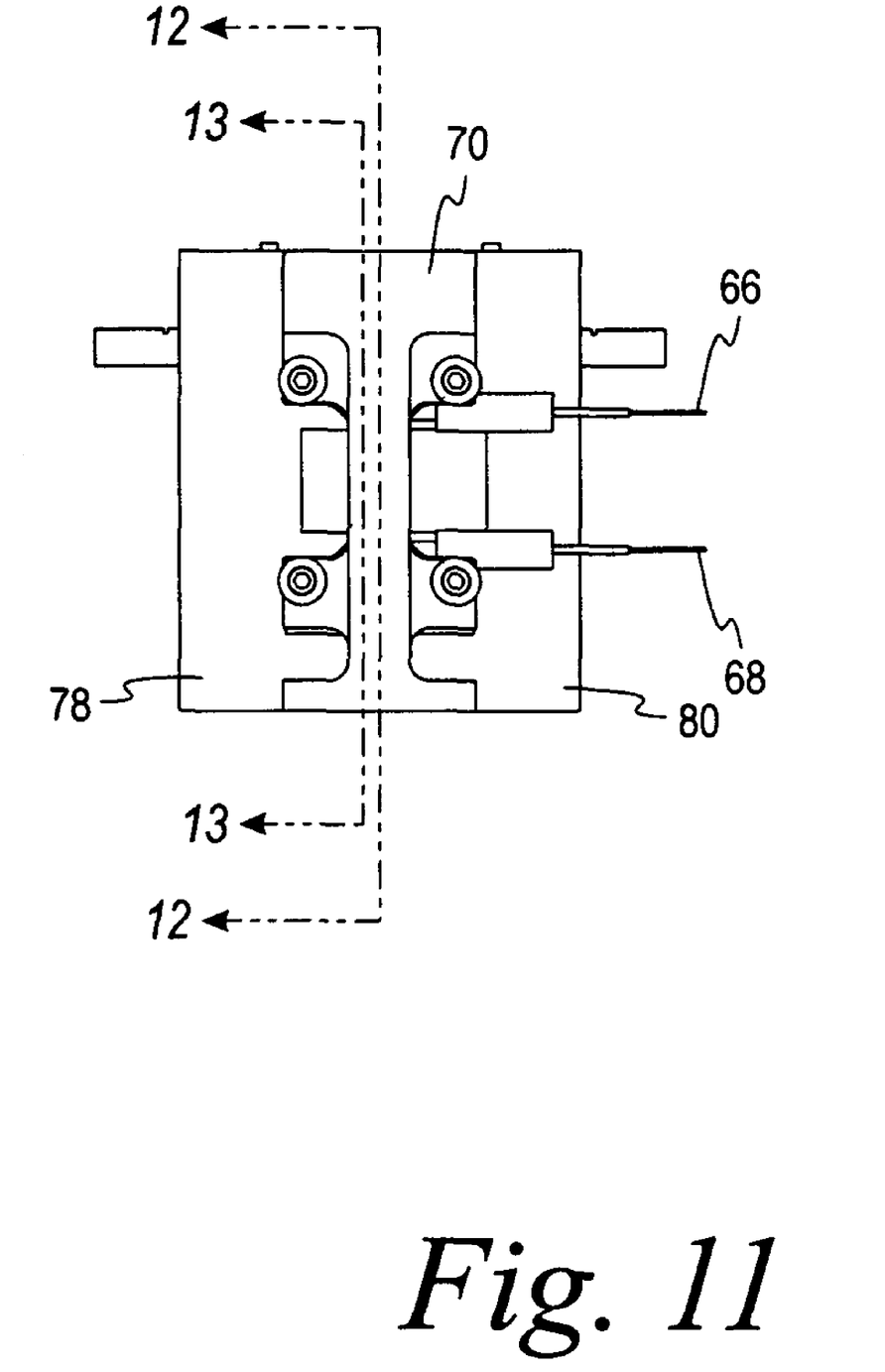
FIG. 11 is a side view of laser slab housing members according to one embodiment of the present invention.

A side view of the laser slab housing blocks 78 and 80 is shown in FIG. 11. An edge bar bracket 70 is shown for holding the edge bars 62 and 64 (not shown in FIG. 1) between the slab housing blocks 78 and 80, and the edge bar conductors 66 and 68 extend behind the edge bar bracket and toward the edge bars 62 and 64. A cross-sectional view of the assembly along the line 12—12 is shown in FIG. 12.

Figure 12:
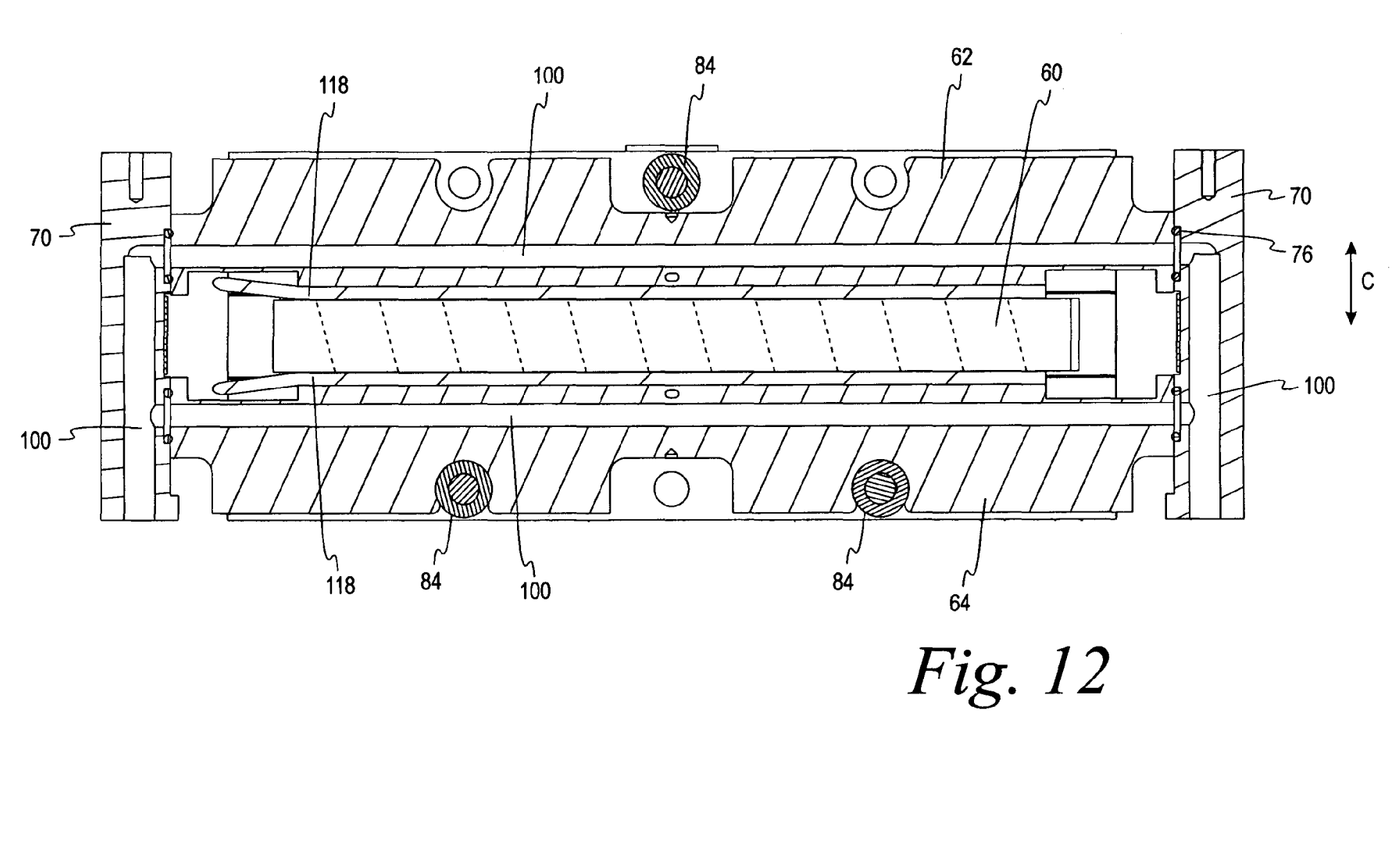
FIG. 12 is a cross-sectional view of the laser slab and laser slab supports of FIG. 11 taken along the line 12—12.

In FIG. 12, the laser slab 60 is shown mounted between the first and second edge bars 62 and 64 and held between edge bar slab interfaces 118. Cooling liquid conduits 100 extend through the edge bar brackets 70 and through the first and second edge bars 62 and 64. Laser slab spacers 84 are also shown in FIG. 12, with one laser slab spacer 84 shown in the first edge bar 62 and two laser slab spacers 84 shown in the second edge bar 64.

Figure 13:
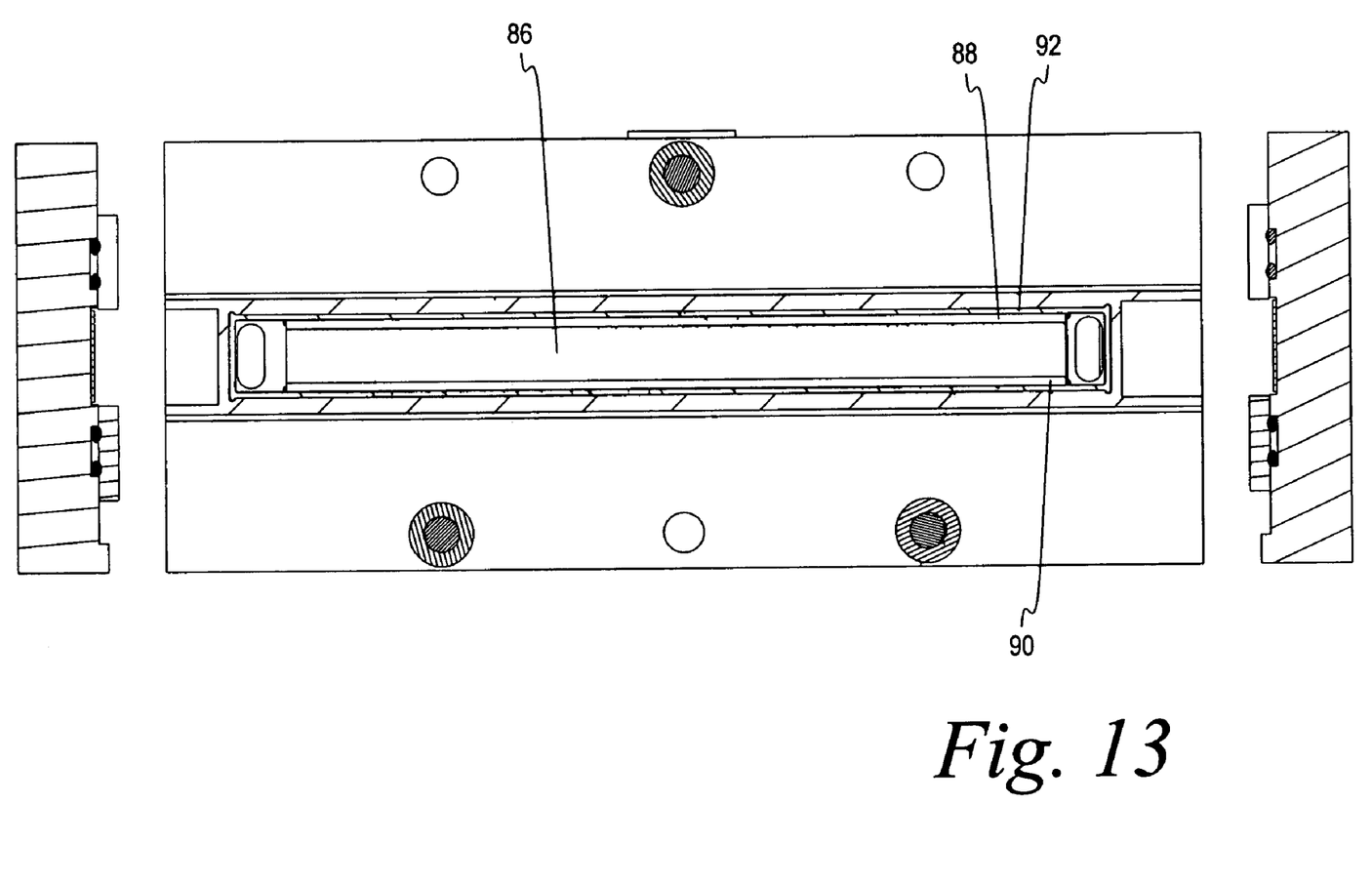
FIG. 13 is a cross-sectional view of the window assembly of FIG. 11 taken along the line 13—13.

Turning now to FIG. 13, a cross-sectional view along the line 13—13 of FIG. 11 shows the window 86 with a surrounding slab seal 92. Upper and lower pump energy shields 88 and 90 are provided on the window 86. While the embodiment of FIG. 13 shows both upper and lower pump energy shields 88 and 90, it is to be understood that only one of the two shields may be provided in some embodiments. The pump energy shields 88 and 90 are provided to control the amount of pump energy entering the laser slab 60, and the location of the laser slab 60 through which pump energy is input into the laser slab 60. To control the vertical location on the laser slab 60 at which pump energy is allowed to enter the laser slab 60, upper pump energy shields 88 and lower pump energy shields 90 are provided so that not all optical energy entering through the windows 86 necessarily enters the laser slab 60. Thus, the pump energy shields 88 and 90 define an aperture for controlling the amount and direction of pump energy that enters the laser slab 60.

According to one embodiment, the pump energy shields 88 and 90 are provided to keep optical pump energy within an ideal energy input area of the laser slab 60. For efficient and reliable laser operation, it is desirable to keep isotherms within the laser slab 60 running vertically (in the direction of arrow C of FIGS. 3 and 12) through the laser slab 60. One benefit of vertical isotherms is better uniformity of the refractive index throughout the laser slab 60. The laser slab 60 is heated to a greater temperature in locations excited by pump energy. Thus, if pump energy is concentrated toward the center of the laser slab 60, the center of the laser slab 60 will heat up and the edges of the laser slab 60 will stay at a relatively cooler temperature. Similarly, if pump energy is allowed to approach the edges of the laser slab 60, the edges of the laser slab 60 will increase in temperature. The pump energy shields 88 and 90 may be properly sized and spaced apart to maximize efficient optical pumping of the laser slab 60. According to some embodiments, the pump energy shields 88 and 90 serve to compensate for manufacturing differences in pumping diode arrays.

In one preferred embodiment, the pump energy shields 88 and 90 are positioned and sized to shield less than approximately 5% of the surface area of each of the windows 86. The pump energy shields 88 and 90 can comprise stainless steel tape with an acrylic-based adhesive adhering the pump energy shields 88 and 90 to the windows 86. In alternative embodiments, the pump energy shields 88 and 90 may comprise other materials such as ceramic or copper shielding.

While the present invention has been described with reference to one or more particular embodiments, those skilled in the art will recognize that many changes may be made thereto without departing from the spirit and scope of the present invention. For example, while the diode mounts 18 have been described as having fluid flowing therein it is to be understood that diode mounts may be provided without fluid conduits and used primarily as supports for the diode array assemblies 24. Each of these embodiments and obvious variations thereof is contemplated as falling within the spirit and scope of the claimed invention, which is set forth in the following claims.

What is claimed is:

1. A laser slab housing comprising:

first and second slab housing members defining a space therebetween for accepting laser slabs of differing dimensions, said first and second slab housing members being separated by a slab housing-gap dimension and each of said first and second slab housing members being separated from said laser slab by respective first and second slab distances;

a laser slab within said space between said first and second slab housing members, said laser slab having a slab dimension; and one or more laser slab spacers between said first and second slab housing members, lengths of said laser slab spacers defining said slab housing-gap dimension, said one or more slab spacers being replaceable with laser slab spacers having different lengths such that said slab housing-gap dimension is alterable and at least one of said first and second slab distances remains approximately constant when said slab dimension is changed due to a change in laser slabs.

2. The laser slab housing of claim 1 further comprising at least one slab seal adapted to be compressed to a compression width between one of said first and second slab housing members and said laser slab.

3. The laser slab housing of claim 2 wherein said lengths of said laser slab spacers are chosen to maintain said compression width of said slab seal approximately constant when said laser slab is replaced with a differently-sized laser slab.

4. The laser slab housing of claim 1 in combination with a kit of laser slab spacers having laser slab spacers of different lengths, wherein said laser slab spacers are selected from said kit of laser slab spacers.

5. The laser slab housing of claim 1 wherein said one or more laser slab spacers have apertures therein for accepting assembly pins holding said first and second slab housing members together.

6. The laser slab housing of claim 1 wherein said one or more laser slab spacers are comprised of the same material as said slab housing members.

7. The laser slab housing of claim 1 wherein said laser slab is held between said first and second slab housing members by at least one edge bar, said at least one edge bar being adapted to accept at least one of said slab spacers therethrough.

8. A method for mounting laser slabs of different dimensions comprising:

providing first and second slab housing members spaced from one another by a slab housing-gap dimension and defining a slab-receiving space therebetween;

selecting at least one laser slab spacer from a plurality of laser slab spacers having a plurality of laser slab spacer lengths to provide a desired slab housing-gap dimension; and spacing said first and second slab housings members from one another with said selected one or more of said laser slab spacers to accommodate said laser slab.

9. The method of claim 8 wherein said selecting includes choosing a longer slab spacer to increase said slab housing-gap dimension when laser slabs having a wider dimension are held within said slab-receiving space.

10. The method of claim 8 further comprising compressing at least one slab seal between a laser slab and at least one of said first and second slab housing members to a compression distance.

11. The method of claim 10 further comprising maintaining said compression distance for laser slabs having different dimensions by selecting and inserting slab spacers of appropriate slab spacer lengths between said first and second slab housing members.

12. The method of claim 10 further comprising mounting a laser slab in said slab receiving space between first and second edge bars.

13. The method of claim 8 further comprising adjusting said slab housing-gap dimension by replacing said laser slab spacers with laser slab spacers having different laser slab spacer lengths.

14. The method of claim 8 further comprising holding said first and second slab housing members together with assembly pins inserted through apertures provided within said laser slab spacers.

15. The method of claim 8, further comprising maintaining approximately constant, when said slab housing-gap dimension is changed, at least one of respective distances between said first and second slab housing members and a laser slab of said laser slabs of different dimensions.

16. A method for mounting laser slabs of different dimensions comprising:

providing a housing assembly having a first slab located in a space defined by a first housing member and a second housing member, said first housing member and said second housing member being separated by a housing-gap dimension that is defined by a first spacer;

disassembling said housing assembly to remove said first slab from said space;

inserting a second slab in said space replacing said first spacer with a second spacer such that said housing-gap dimension accommodates a difference between a first width of said first slab and a second width of said second slab; and reassembling said housing assembly with said second slab and said second spacer.

17. The method of claim 16, wherein said second spacer is selected such that said housing-gap dimension remains approximately constant.

* * * * *